United States Patent
Schwartzman

(10) Patent No.: US 7,418,411 B2
(45) Date of Patent: Aug. 26, 2008

(54) MULTI-PICTURE ONLINE COMMERCE FEATURE

(76) Inventor: Michael Schwartzman, 15 Cold Spring Hills Rd., Huntington, NY (US) 11743

( * ) Notice: Subject to any disclaimer, the term of this patent is extended or adjusted under 35 U.S.C. 154(b) by 0 days.

(21) Appl. No.: 11/941,384

(22) Filed: Nov. 16, 2007

(65) Prior Publication Data

US 2008/0086388 A1 Apr. 10, 2008

Related U.S. Application Data

(62) Division of application No. 10/228,506, filed on Aug. 27, 2002, now Pat. No. 7,319,981.

(51) Int. Cl.
*G06Q 30/00* (2006.01)
(52) U.S. Cl. .......................... 705/26; 705/37
(58) Field of Classification Search .................. 705/26, 705/37
See application file for complete search history.

(56) References Cited

U.S. PATENT DOCUMENTS

| 5,917,912 | A | 6/1999 | Ginter et al. |
|---|---|---|---|
| 6,029,195 | A | 2/2000 | Herz |
| 6,058,417 | A | 5/2000 | Hess et al. |
| 6,141,653 | A | 10/2000 | Conklin et al. |
| 6,202,051 | B1 | 3/2001 | Woolston |
| 6,243,691 | B1 | 6/2001 | Fisher et al. |
| 6,246,683 | B1 | 6/2001 | Connery et al. |
| 6,332,135 | B1 | 12/2001 | Conklin et al. |
| 6,460,036 | B1 | 10/2002 | Herz |
| 6,718,535 | B1 | 4/2004 | Underwood |
| 6,732,161 | B1 | 5/2004 | Hess et al. |
| 2001/0039531 | A1 | 11/2001 | Aoki |
| 2002/0059262 | A1 | 5/2002 | Hsieh et al. |
| 2003/0115167 | A1* | 6/2003 | Sharif et al. .................... 707/1 |
| 2003/0187744 | A1 | 10/2003 | Goodridge |

OTHER PUBLICATIONS

"Web graphics: Small and quick is in", Anonymous author, InfoWorld. San Mateo: Jun. 19, 1995. vol. 17, Iss. 25; p. 75, downloaded from the Internet on Sep. 5, 2007.*

* cited by examiner

*Primary Examiner*—James Zurita
(74) *Attorney, Agent, or Firm*—Scully, Scott, Murphy & Presser, P.C.

(57) ABSTRACT

A software application that provides images of multiple items associated by a common seller on an on-line commerce network comprising query software for automatically retrieving from a list all items associated by a common seller from a server, retrieving the location of an image of each item and retrieving the image of each item after a user has identified an item being sold by the seller from a list, display software for automatically displaying the retrieved images as thumbnail images with an image map layer containing each location of the server of a file associated with each thumbnail image. The invention also comprises a method of doing the same.

14 Claims, 4 Drawing Sheets

MULTI-PICTURE ONLINE COMMERCE FEATURE

CROSS REFERENCE TO RELATED APPLICATION

The present application is a divisional of co-pending U.S. patent application Ser. No. 10/228,506 filed on Aug. 27, 2002, the entire content and disclosure of which is incorporated herein by reference.

BACKGROUND OF THE INVENTION

This invention relates to the capture and display of files on a network. More specifically the invention relates to the display and management of items on sale at an online commerce site.

As Internet access has increased so to has the importance of e-commerce strategies for businesses. In 2000, 41.5% of U.S. households (44 million households) had Internet access. Global internet usage is at 34% with 15% of these users making an on-line purchase. 32% of all Internet users in the U.S. have made an on-line purchase. Of the items being purchased, the most popular include books, CDs, PC hardware and software, office supplies as well as apparel and accessories.

Much of the success of an online commerce site depends on how users interact online with the company. It is imperative that the online experience of a user be convenient and efficient to close on sales and maintain customer loyalty. The current experiences created by these sites have limitations. In particular, person-to-person commerce sites such as popular auction sites lack certain functions that would add convenience and efficiency to their transaction systems.

Internet auction sites such as Ebay, Yahoo, and other online commerce sites, have several things in common. The sellers are all registered and assigned a user identification. All items registered for sale are assigned unique identifiers. Among the user supplied detail information regarding an item for sale, a picture can be included. The sites have functions that allow visitors of the site to view items for sale grouped by predetermined criteria. The criteria could include viewing all items for sale by a particular seller but most often is viewing items for sale that match a phrase in the description of the item (such as show me all antique gold jewelry). A list is produced that includes multiple sellers of antique gold jewelry. The lists are usually sorted. The items might be shown chronologically in the order they were registered for sale with the newest registered showing first. They might be shown with the items registered for sale most recently. They might be shown with the least expensive items listed first or the most expensive items listed first. Typically once an item is no longer available for sale it is not shown in the list.

A site visitor can choose to learn more about a particular item in a list by clicking on a single entry displayed on the view. That action brings the site visitor to a detail view of that item containing detail information such as a description, a picture of the item, the current bid or cost of the item.

An individual seller's items have limited visibility in this typical demonstration since, unless the site visitor chooses to view all the items of the seller, there are typically thousands of competing items in a list. The seller's items are only most visible for the short time they are at the top of the list.

SUMMARY OF THE INVENTION

The present invention is a method and apparatus for giving more visibility to a seller's items by displaying a small picture (thumbnail) of some or all of the seller's items whenever one of the seller's items are chosen for viewing from a list. This provides for effective and efficient presentation of a seller's items. A site visitor can automatically view a thumbnail presentation of some or all items from one particular seller by viewing the details of a single item of the seller. In addition, by invoking a link by clicking or some other method on a thumbnail of a desired item, the site visitor goes directly to the detailed view of that item.

The invention is a software application that provides images of multiple items associated by a common seller on an on-line commerce network comprising a Web server containing multiple seller associated registered files that each have images and detail information. A statement providing for retrieval of some or all images from seller associated files is included in the application. The software application suite includes query software that retrieves the associated images from a Web server, and an image and image map generator that creates an image of thumbnail images of the associated images and an image map file that contains the URL used to retrieve the detail information from the registered file associated with the image. The application includes a Web server service wherein a user can request information of a registered file and in addition to the information of the file being displayed, the master image containing the thumbnail images of all images from the associated files is displayed.

DETAILED DESCRIPTION OF THE INVENTION

Figure 1:
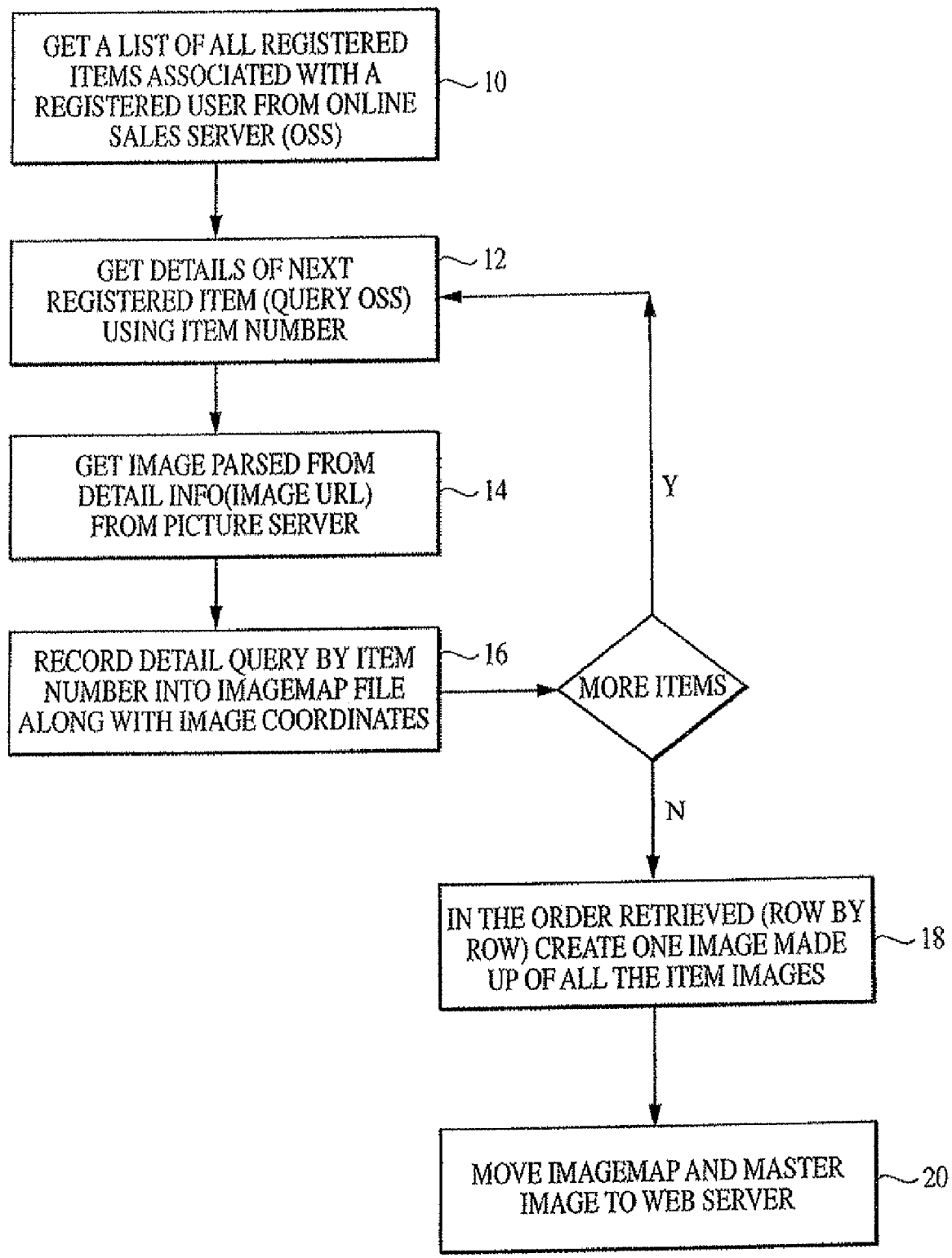
FIG. 1 is a flow diagram of the logic of one embodiment of the present invention.

In the preferred embodiment, the present invention comprises machine executable instructions for a processor. Alternatively, the invention may be embodied in any combination of hardware and software capable of executing the logic steps required. The processor may be incorporated into a computer or other electronic device capable of performing the appropriate functions. Alternatively, the present invention may be embodied as instructions in a machine readable storage medium which may be read or received by and executed by a processor.

Preferably, the present invention is implemented on a client-server network such as the Internet. Information travels over the Internet via a variety of languages known as protocols. Typically today, application programs are placed on an application server which resides on a server in a two tier architecture. A new service such as the present invention is implemented by installing a new application program.

Most on-line commerce today is accessed over the Internet via the World Wide Web, The Web is a system of Web servers that support documents formatted in a script called HTML (HyperText Markup Language). HTML defines the structure and layout of a document by using a variety of tags and attributes. A Web server is a server that may be browsed by a Web browser (client) and sends results to queries in HTML. HTML supports links (hyperlinks) that provide loading and viewing associated documents or Web pages. A Web page is a document on the World Wide Web identified by a unique Uniform Resource Location (URL). Web pages may also contain graphics, video, music and other information. Browsers and Web servers communicate through the authoring language HTTP (HyperText Transfer Protocol).

It is understood that the scripts, protocols and structures discussed are common means of operating an on-line commerce site today. However, the invention is not specific to any one script, protocol structure, architecture or organization and is applicable to any networked architecture, Additionally, certain preferred embodiments are discussed herein, however, it will be apparent to one skilled in the art that many embodiments are possible within the scope and spirit of the present invention.

The invention's operation can be broken down into three steps: information gathering, image generation, and web server service. These will be illustrated by reference to an on-line auction Web service. This Web service has multiple sellers.

Information gathering includes the process of an online sales service (Web server) being queried to return a list of all items for sale from a particular seller. This may be accomplished using software such as fget or lynx. An example of this is:

lynx-width 255-dump crawl http://cgi6.ebay.com/awcgi/
        eBayISAPI.dll? MfcISAPICommand = ViewListedItems\&user-id=chachka&sort=3&page=&rows=200since=−1

One piece of information retrieved by this type of query is a sale item identifier. Each item listed by sellers are given a unique item identifier. For each sale item identifier, the online sales service is queried to return the details of each item for sale. An example of this is:

lynx-dump-image_links+http://cgi.ebay.com/aw-gi/
        eBayISAPI.dll?ViewItem\&item=12345678

The URL of the associated image for the item is one piece of information that is retrieved by this query. Other information in the detail information may include a written description of the item, preferred piece, date the auction or sale will take place or expire and address of seller. The Web server storing the picture is then contacted to supply a copy of the picture. The image Web server may be a separate server than the server supplying detail information, it may be administered by a third party or it may be a separate partition or logical server.

Image Generation includes creating a single master image made up of thumbnail images of the retrieved items. A thumbnail image is a smaller version of an image and takes up less screen space. An associated server side image map file is also created. This image map file contains a specific URL that is the URL used to retrieve the details of a registered item on the online sales server and the associated area (coordinates) of the image that refers to the registered item. Preferably, the image and the image map are stored on a web server outside of the domain of the online sales servers domain.

The Web Server service includes a seller registering an item for sale at the online commerce site by including in the description of the item an HTML statement such as:

<A HREF=http://www.navpics.com/maps/
        chachka.map><IMG SRC=http://www.navpics.com/jpgs/chachka.jpg BORDER=0 ISMAP></
        A>

Whenever detail information of this registered item is requested by a viewer, in addition to the detail information displayed for this item, the master image containing thumbnail images of the seller's other items automatically appears. This master image has special image map properties. If there is a mouse click on any area of the image, a request is sent to the server storing the image map to query the online sales service for the detail view of the associated registered item and send that information back to the viewer's browser.

In one embodiment, at an agreed interval of time the above mentioned steps would occur generating a new, updated image and map. This may also occur after a seller initiated action. Any registered item for sale containing the image map HTML when displayed would show the newest image and trigger the newest queries when clicked on.

The views of the master image are preferably sorted by some filter. The filter may sort the items that compose the master image chronologically in the order they were registered for sale with the newest registered showing first or the order they are being auctioned. They might also be shown with the least expensive items listed first or the most expensive items listed first. All items that have already been sold, auctioned or expired pursuant to a predetermined term are preferably eliminated from the master image. The criteria for the filter may be automatically generated, chosen by the seller or chosen as an option by a user.

The Web service preferably has support of HTTP protocols and information returned to the end user's browser is in HTML, provides sellers a unique identifier, and allows sellers to add detail information in the form of HTML.

Initially, sellers register their items for sale by providing detail information and images, or the location of such, to an online sales server. A viewer typically contacts the sales server by way of a request from a Web browser. One example of such a request is: to view all items of a category for sale on the server. A list is returned to the viewer which contains all of the items requested from all of the registered sellers. On an auction site this would be a generic auction list page. The retrieved items on the list are hypertext links that lead to a Web page of detail information concerning each item.

When such a link is invoked via a user associated action, such as a click, or a predetermined time interval expires, the method of the present invention is automatically executed. As shown by the logic flow diagram of FIG. 1, the software application of the present invention retrieves a list of some or all registered items associated with the seller from the online sales web server 10. This list is compiled on the online sales server.

The software retrieves the detail information of each registered item on the list from the online sales Web server 12.

The detail information contains the URL of an image of the item. The application provides for parsing this URL from the detail information 14.

The application records the detail query, preferably by identification number, into an image map file along with the coordinates of the corresponding thumbnail image location in the master image 16. An image map file contains the coordinates of active regions of a graphic or image and their corresponding URL. Once this is completed for each item on the list or a predetermined number of items, a new image is created comprising automatically scaled thumbnail images of the items 18.

This new image and image map file may be stored on a separate server from the items and detail information 20.

Figure 2:
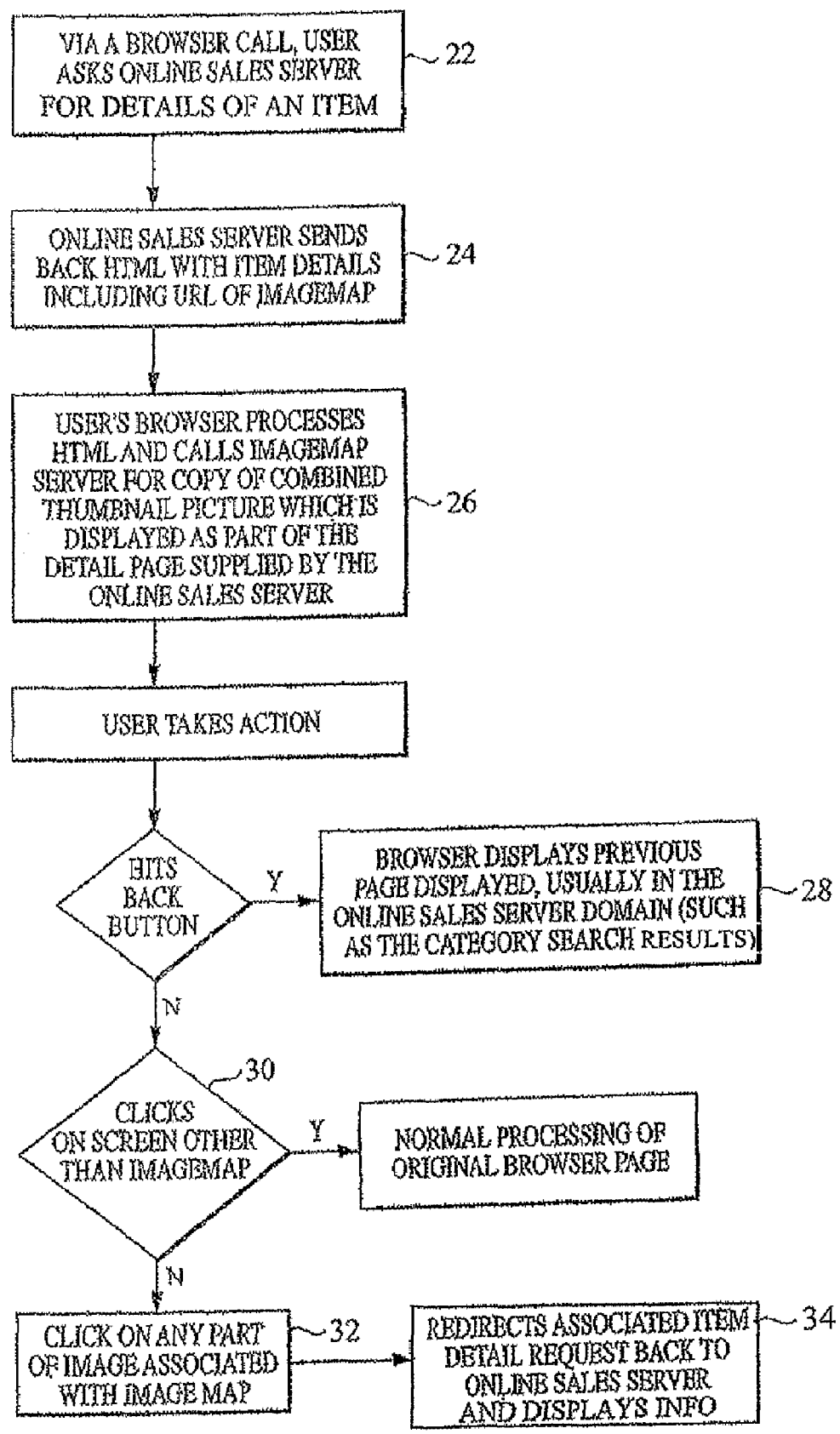
FIG. 2 is a flow diagram of the logic from a viewers perspective of one embodiment of the present invention.

A viewers perspective of an embodiment of the present invention is shown in FIG. 2. A browser querys the online sales server for details of an item 22. The sales server sends back HTML with the detail information including the URL of the image map 24.

The viewer's browser processes the HTML and querys the image map server for the image comprised of the thumbnail images 26. This image is displayed by the browser 26. From here, a viewer can either go back to the list of items from multiple sellers 28, click on some part of the screen other than the created image 30 or click on a thumbnail 32. By clicking on a thumbnail, the detail information associated with the thumbnail is retrieved and displayed 34.

Figure 3:
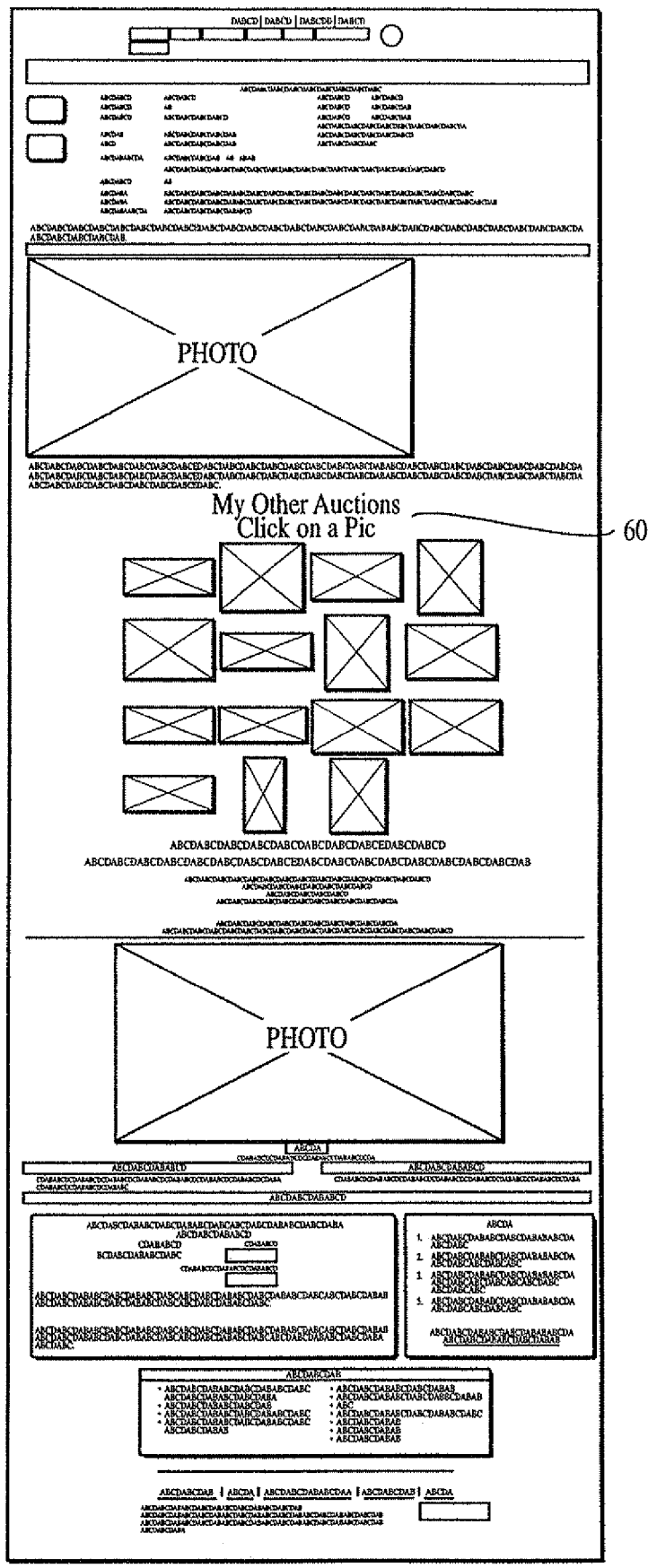
FIG. 3 is a screen capture of an interface depicting the image of thumbnail images retrieved by the present example.

FIG. 3 depicts a screen capture of a display of a detail item retrieved from an auction list of an online commerce site (www.ebay.com). The seller included in the description HTML for retrieving the master image and map. The master image is seen under the text "My Other Auctions" "Click on a Pic" 60 as 14 separate thumbnails that is actually one image.

Figure 4:
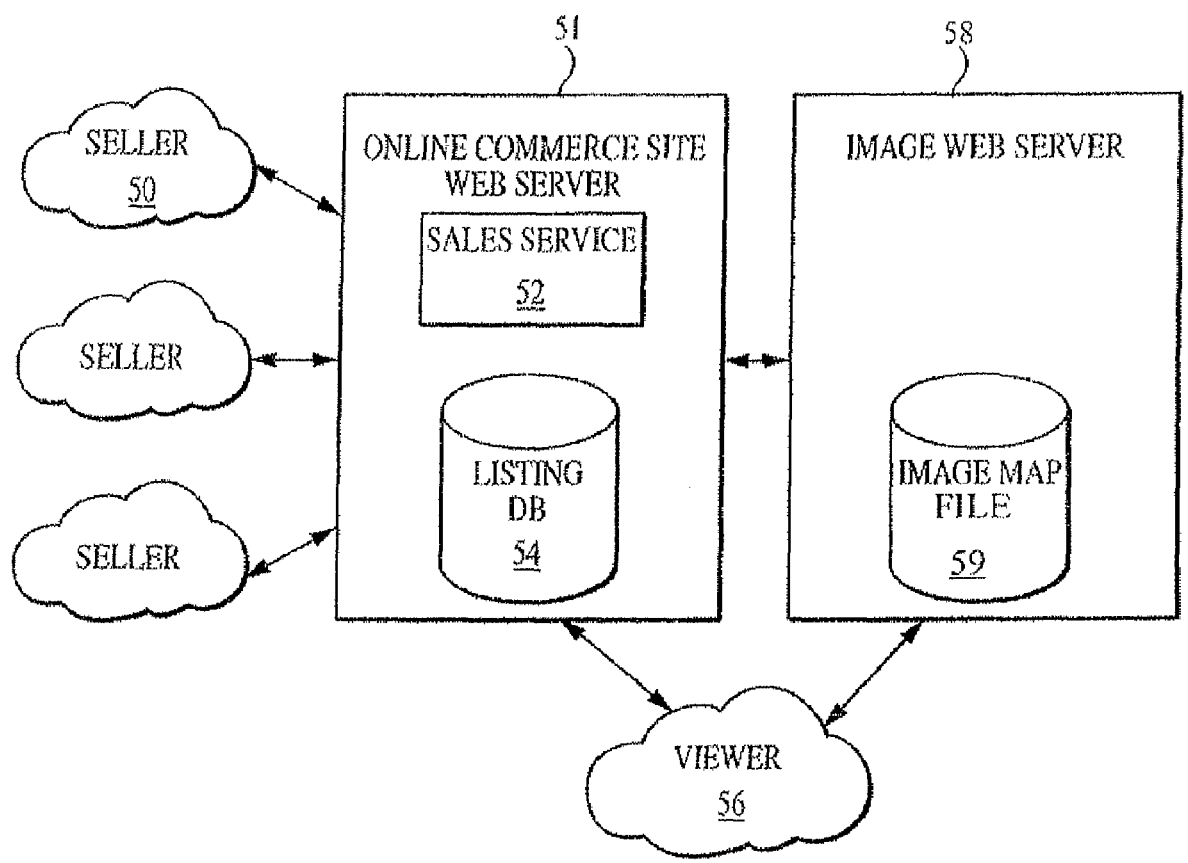
FIG. 4 is a high level depiction of the devices implementing the present invention.

FIG. 4 depicts a high level illustration of the devices and interaction between the parties of the present invention. Multiple sellers 50 post detail information at an online commerce site. This site records the detail information using its sales service 52 in communication with a listing database 54.

A viewer 56 communicates to the online commerce site 51 via a Web browser. By query, the commerce site 51 returns to the viewer 56 a list of all items from all sellers of a particular item category, i.e. antique coins. The viewer 56 may click on any one item from this list from the listing database 54 to return the detail information of that item. The detail information returned by the commerce site 51 includes instructions for the user's browser to fetch and display from the image web server 58 an image containing some or all items associated by the same seller and assign the image map properties. This information is parsed from the detail information. The detail query and image location is stored in an image map file 59 on the image web server 58.

The viewer 56 may click any area of this master image (may click on a thumbnail displayed in the master image). The click action sends a request to the image web server 58 and passes it the coordinates of the thumbnail location. The image web server 58 sends a query on behalf of the viewer 56 for detail information of the item associated with the thumbnail. The online commerce site 51 sends the detail information from the listing database 54 to the viewer 56.

This invention may be applied to other network on Web services other then those offering items for sale. For example, an online server offering hobbyists a way to show and share their collectables. Accordingly, it should be readily appreciated that the transactional system of the present invention has many practical applications. Additionally, although the preferred embodiment has been illustrated and described, it will be obvious to those skilled in the art that various modifications can be made without departing from the spirit and scope of this invention. Such modifications are to be considered as included in the following claims unless the claims expressly recite differently.

What is claimed is:

1. A computer readable medium having computer readable program for operating on a computer for enhancing a Web based selling platform, said program comprising instructions that cause the computer to perform the steps of:
    retrieving images associated by a common seller based on a query of one item from said common seller from a list of items;
    manipulating the retrieved images to produce a master image of thumbnail images of the retrieved images, each of the thumbnail images having unique master image coordinates; and
    providing for an image map wherein a user clicks on one of the thumbnail images to send a request to a server storing the image map, said request including the unique master image coordinates of the thumbnail image, to query a Web server for a detail information page of an associated registered item and sending the information page to the user for viewing.

2. The computer readable program according to claim 1, wherein:
    the thumbnail images are ordered by a filter.

3. The computer readable program according to claim 2, wherein:
    the filter criteria is chosen by a user.

4. The computer readable program according to claim 1, wherein:
    the retrieving step updates the retrieved images after a predetermined term.

5. The computer readable program according to claim 4, wherein:
    the retrieving step eliminates the retrieved images after the predetermined term.

6. The computer readable program according to claim 1, wherein:
    the retrieving step updates the retrieved images after a seller initiated action.

7. The computer readable program according to claim 6, wherein:
    the retrieving step eliminates the retrieved images after the seller initiated action.

8. A system for enhancing a Web based selling platform, said system comprising:
    images associated by a common seller based on a query of one item from said common seller from a list of items;
    an image map generator for manipulating the associated images to produce a master image of thumbnail images of the associated images, each of the thumbnail images having unique master image coordinates, said image map generator providing an image map stored on a server; and
    a Web server, wherein a user clicks on one of the thumbnail images to send a request to the server storing the image map, said request including the unique master image coordinates of the thumbnail image, to query the Web server for a detail information page of an associated registered item and sending the information page to the user for viewing.

9. The system of claim 8, wherein:
the thumbnail images are ordered by a filter.

10. The system of claim 9, wherein:
the filter criteria is chosen by the user.

11. The system of claim 8, wherein:
the associated images are updated after a predetermined term.

12. The system of claim 11, wherein:
at least one of the associated images is eliminated after the predetermined term.

13. The system of claim 8, wherein:
the associated images are updated after a seller initiated action.

14. The system of claim 13, wherein:
at least one of the associated images is eliminated after the seller initiated action.

* * * * *